United States Patent
Mock et al.

(10) Patent No.: US 9,731,549 B2
(45) Date of Patent: Aug. 15, 2017

(54) DRIVEN WHEEL BEARING UNIT WITH INTEGRATED TORQUE MEASUREMENT

(71) Applicant: Schaeffler Technologies AG & Co. KG, Herzogenaurach (DE)

(72) Inventors: Christian Mock, Schweinfurt (DE); Christian Schmitt, Niederwerrn (DE); Florian Koniger, Schweinfrut (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/904,530

(22) PCT Filed: May 14, 2014

(86) PCT No.: PCT/DE2014/200217
§ 371 (c)(1),
(2) Date: Jan. 12, 2016

(87) PCT Pub. No.: WO2015/010693
PCT Pub. Date: Jan. 29, 2015

(65) Prior Publication Data
US 2016/0207353 A1    Jul. 21, 2016

(30) Foreign Application Priority Data
Jul. 25, 2013 (DE) .................. 10 2013 214 580

(51) Int. Cl.
*F16C 41/00* (2006.01)
*B60B 27/00* (2006.01)

(52) U.S. Cl.
CPC ...... *B60B 27/0068* (2013.01); *B60B 27/0005* (2013.01); *B60B 27/0031* (2013.01)

(58) Field of Classification Search
CPC ............ B60B 27/0005; B60B 27/0031; B60B 27/0068; F16C 19/186; F16C 41/007; F16C 2326/02; G01L 3/1435; G01L 5/0023
See application file for complete search history.

(56) References Cited

U.S. PATENT DOCUMENTS

| 7,688,216 | B2 | 3/2010 | Mizutani et al. |
| 9,063,024 | B2 | 6/2015 | Kitamura |
| 2005/0169563 | A1* | 8/2005 | Inoue .............. B60B 27/00 384/448 |

(Continued)

FOREIGN PATENT DOCUMENTS

| DE | 3604630 | 3/1989 |
| DE | 10338172 | 6/2005 |

(Continued)

*Primary Examiner* — Phillip A Johnson
(74) *Attorney, Agent, or Firm* — Volpe and Koenig, P.C.

(57) ABSTRACT

The invention relates to a wheel bearing unit (1) for supporting a vehicle wheel which can be driven. This wheel bearing unit (1) includes a wheel hub (2) which forms a hollow space (11) and is rotatably supported by a wheel bearing (3) formed as a rolling bearing, wherein the wheel bearing is inserted (3) in a wheel carrier. Furthermore the wheel hub (2) is connected by a hub flange (21) to the vehicle wheel and reciprocally to the hub flange (21) by an end toothing (9) in positive engagement with a drive joint (8). A measurement of a torque or a torsion takes place by a sensor (18) at an inner wall (17) of the hollow space (11) of the wheel hub (2).

7 Claims, 1 Drawing Sheet

(56) References Cited

U.S. PATENT DOCUMENTS

| | | | |
|---|---|---|---|
| 2005/0222740 A1* | 10/2005 | Inoue | B60B 27/00 701/70 |
| 2006/0061352 A1* | 3/2006 | Koyagi | F16C 33/723 324/173 |
| 2007/0110350 A1* | 5/2007 | Ohtsuki | B60B 27/00 384/448 |
| 2007/0135220 A1 | 6/2007 | Welschof | |
| 2007/0157742 A1* | 7/2007 | Kouduki | B60B 27/00 73/862.541 |
| 2009/0229379 A1* | 9/2009 | Ozaki | B60B 27/0005 73/862.69 |

FOREIGN PATENT DOCUMENTS

| | | |
|---|---|---|
| DE | 102004001448 | 10/2006 |
| DE | 102006031456 | 1/2008 |
| DE | 102012016898 | 2/2013 |
| EP | 1666860 | 6/2006 |
| GB | 2186534 | 10/1988 |

\* cited by examiner

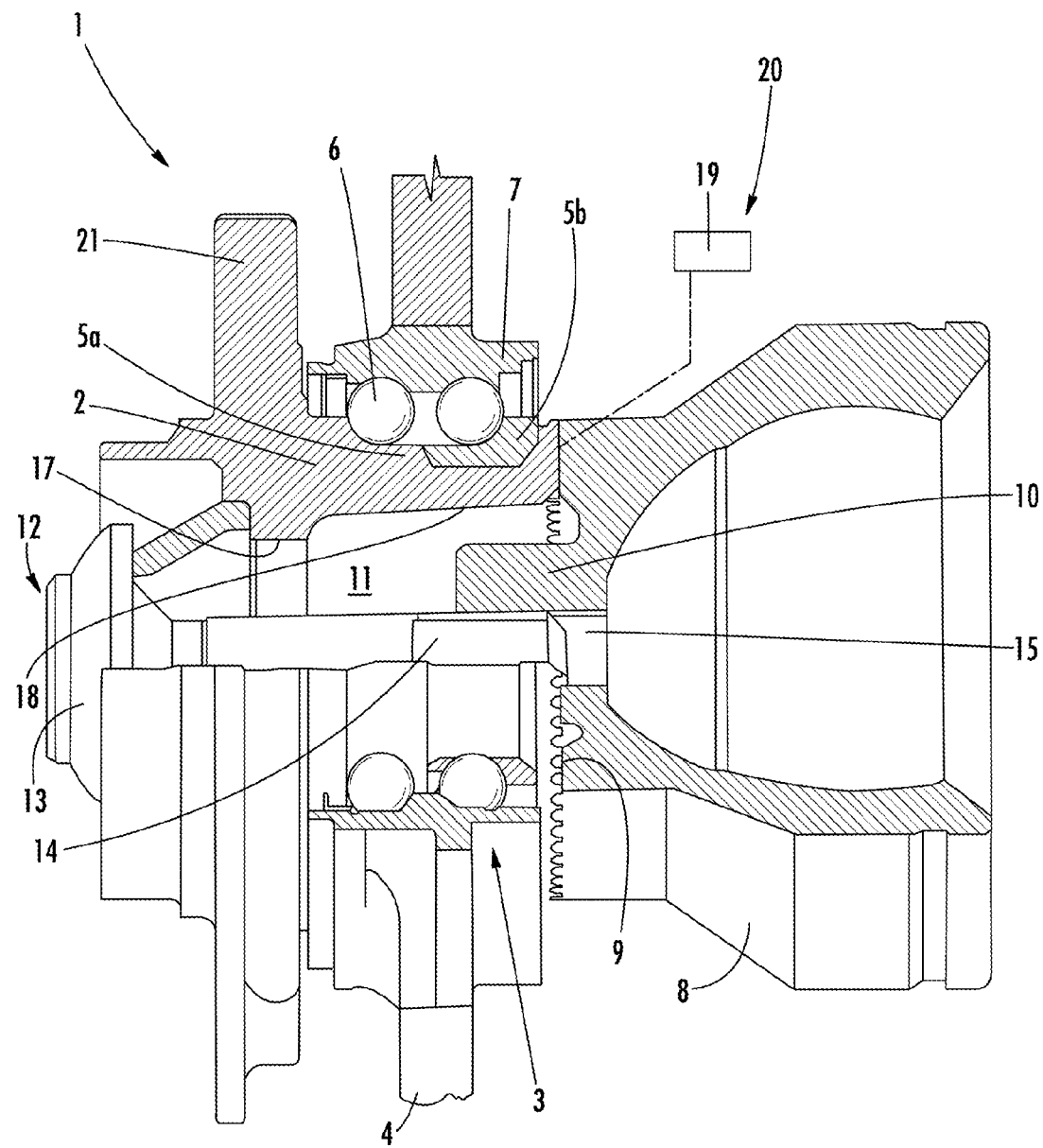

DRIVEN WHEEL BEARING UNIT WITH INTEGRATED TORQUE MEASUREMENT

BACKGROUND

The invention relates to a wheel bearing unit for supporting a drivable wheel on a wheel bearing of a vehicle. This wheel bearing unit comprises a wheel hub that forms a central hollow space and is supported so that it can rotate by a wheel bearing formed as a rolling bearing. The wheel bearing encloses a hub flange connected to the vehicle wheel and meshes with a drive element with a positive-fit connection by means of spur gearing on the opposite side relative to the hub flange, wherein the wheel hub and the drive element are secured with a non-positive fit by a threaded connection. The wheel bearing unit also comprises a sensor for measuring a torque. In addition, the invention relates to an arrangement for detecting and controlling drive torques for driven vehicle wheels.

Motor vehicles in which, in particular, all four wheels are driven are being equipped more and more with a control for distributing the drive torque, which produces improved vehicle transverse dynamics while simultaneously increasing driving safety. For controlling the drive torque distribution, suitable measurement devices are required to be able to determine the appropriate driving situation.

From DE 103 38 172 B3, a drivable wheel bearing unit with a swivel joint is known. For transmitting a drive torque, a journal of the drive shaft has external teeth that mesh with internal teeth of the wheel hub. In the area of the meshing journal, the wheel hub is supported so that it can rotate on the wheel carrier by a double-row rolling bearing. In the known wheel bearing unit DE 36 04 630 C2, the drive torque is transmitted from the swivel joint of the drive shaft to the wheel hub via spur gearing.

DE 10 2008 050 236 A1 relates to a bottom bracket for a bicycle including sensors for detecting the torques of the individual foot pedals. To do this, a chain ring is magnetized in some sections. Due to a magnetostrictive effect, the magnetization changes as soon as mechanical stress caused by a torque occurs in the bottom bracket shaft. The changed magnetic field is detected by sensors.

DE 10 2006 031 456 A1 discloses a wheel bearing arrangement for supporting a drivable wheel on a wheel carrier of a vehicle. An inner bearing ring of the wheel bearing is here connected locked in rotation with a wheel hub that is coupled with a drive shaft. An axial section of the inner bearing ring has an inverse magnetostrictive effect. By the use of a sensor, changes to the magnetic properties that are set when a torque is applied can be detected in the axial section.

SUMMARY

The objective of the present invention is to provide a wheel bearing unit for a driven vehicle wheel that includes protected torque measurement that is also optimized in terms of installation space and costs.

This object is achieved by a wheel bearing unit with one or more features of the invention. Preferred constructions of the invention are listed in the dependent claims.

According to one aspect of the invention, for determining the torque introduced into the wheel bearing unit, the central hollow space of the wheel hub is defined. The measurement of the torque or torsion is realized by a sensor of the inner wall in the hollow space of the wheel hub. The measure according to the invention can be combined, in particular, with a wheel hub that is connected to the drive part by spur gearing. This gearing provides a significantly enlarged hollow space of the wheel hub in comparison to radial gearing. Advantageously, the torque detection integrated according to the invention in the wheel hub guarantees a protected installation position and consequently a high degree of installation freedom.

According to a preferred construction of the invention, the central hollow space of the wheel hub has, at least in some areas on an inner wall of the hollow space, an inverse magnetostrictive effect that can be used to determine the torque. With this effect that can be optimized by optional magnetization or magnetizable preconditioning, the torque introduced into the wheel hub can be determined on the inner wall, which thus performs the function of a sensor. In the drive state, the torque introduced into the wheel hub causes torsion, in particular, in the cylindrical section of the wheel hub. The mechanical stress set in this way has the effect that magnetic properties (relative permeability or magnetic field lines of optional pre-magnetization) change in magnitude and/or direction due to the inverse magnetostrictive effect. The changed magnetic properties are a measure for the torque. Thus, torque or torsion loading the wheel bearing unit or the wheel hub can be determined continuously and at the same time the actual torque acting on the vehicle wheel can be determined.

The inverse magnetostrictive effect is a magnetic phenomenon of deformation in which deformation on a surface or an inner wall occurs when a torque acts on a rotatable shaft or a housing. Through the inverse magnetostrictive effect, mechanical loading causes a change of magnetic properties, in particular, magnetic permeability, which can be used to determine the torque. Advantageously, the inner wall in the hollow space of the wheel hub is already part of the sensor, so that no additional part is required.

To optimize the measurement of the torque, according to the invention for the inner wall or for at least one partial area, a magnetic pre-conditioning can be provided. The invention also provides, as a measure for improving the inverse magnetostrictive effect, a coating for the inner wall of the wheel hub. In this way, the inner wall is coated at least in some areas with a suitable material.

In comparison with previous measurement principles for determining the mechanical stress state (for example, strain gauges), these strain-sensitive sensors, which are expensive to produce, are not required in the inner space or hollow space of the wheel hub.

Another construction of the invention also provides, for determining the inverse magnetostrictive effect, the use of a sensor formed as a coil or semiconductor sensor. This sensor integrated within the hollow space of the wheel hub detects the changing magnetic properties that are set when a torque is applied to the wheel hub.

For detecting and implementing changed magnetic properties that are determined by torsion-sensitive sensors, these are connected to evaluation electronics that together form a measurement device. Preferably, wireless signal and energy transmission is provided between the sensors and the evaluation electronics. Through these measures, simplified, economical transmission means can be realized.

According to another preferred construction of the invention, additional sensors are provided in the central hollow space of the wheel hub. In addition to the torque or torsion sensor formed by the inner wall, for example, a temperature and/or rotational speed sensor could be used. Through the additional sensors, the complex behavior of the vehicle can be detected or controlled or a warning in the event of an irregularity could be issued. For optimizing the installation space and components, the additional sensors could be combined into one structural unit.

The invention also includes an arrangement for detecting and controlling the drive torques of the drivable vehicle wheels. The drive torque is detected in each drivable vehicle wheel by a sensor formed by the inner wall of the wheel hub through the use of an inverse magnetostrictive effect. Measured values of the sensor are fed to evaluation electronics by which the drive torque of the vehicle wheels is controlled directly or indirectly in connection with a central control unit of the vehicle. With the arrangement according to the invention it is now possible to determine the actual torque acting on the wheel. In this way, an optimized torque distribution can advantageously take place as a function of the actually occurring torques on the individual wheels.

BRIEF DESCRIPTION OF THE DRAWINGS

Additional details and improvements of the invention are given from the following description of the figures. Shown here are:

FIG. 1 a preferred embodiment of a wheel bearing unit according to the invention in a side view.

DETAILED DESCRIPTION OF THE PREFERRED EMBODIMENTS

FIG. 1 shows a partially sectioned side view of a wheel bearing unit 1 that is designed for supporting a drivable vehicle wheel (not shown). The wheel bearing unit 1 comprises a wheel hub 2 on which a wheel bearing 3 is positioned by which the wheel hub 2 is supported so that it can rotate in a stationary wheel carrier 4 of the vehicle.

The wheel bearing 3 formed as a double-row rolling bearing comprises separated inner bearing rings, wherein a first bearing ring 5a is formed by a shoulder on the wheel hub 2. The second inner bearing ring 5b forms a separate ring element fixed on the wheel hub 2. On the outside, the rolling bodies 6 are guided in a common bearing ring 7 that is enclosed on the outside by a ring flange 4 that is connected to a wheel carrier (not shown). A drive of the wheel bearing unit 1 takes place by means of a drive joint 8 that is also called a swivel joint and is connected locked in rotation with the wheel hub 2. The drive joint 8 is part of a drive shaft (not shown) from which a drive torque is transmitted to the wheel bearing unit 1. Through the use of positive-fit spur gearing 9 provided between the wheel hub 2 and the drive joint 8, these parts are meshed together. The spur gearing 9 guarantees a durable connection and thus a secure transfer of torque and simultaneously allows a quick assembly and disassembly of the wheel hub 2 and the drive joint 8. A centering of the components joined by the spur gearing 9 is realized by a shoulder 10 that projects in the axial direction to a limited extent and engages with a positive fit in a hollow space 11 of the wheel hub 2. For the non-positive connection, a threaded connection 12 is provided whose fastener head 13 is supported on the end face on the wheel hub 2 and is screwed with a threaded shaft 14 into a threaded hole 15 of the drive joint 8. On the side of the wheel bearing 3 facing away from the drive joint 8, the wheel hub 2 is connected integrally with a hub flange 21 on which the vehicle wheel (not shown) is fastened detachably by means of threaded connections.

One or more sensors are arranged in the central hollow space 11 of the wheel hub 2. At least in the area of the sensor or sensors 18, the inner wall 17 of the hollow space 11 and/or a special coating has a pronounced inverse magnetostrictive effect. This effect is used in the operating state of the vehicle when the torque loading of the wheel hub 2 causes a torsion of the inner wall 17, which changes the magnetic properties. The changed magnetic properties or the changed magnetic field is measured with the sensor(s) 18 allocated to the inner wall 17. Through the use of a wireless connection (shown as a dash-dot line), the sensor 18 is connected for transmitting energy and signals to evaluation electronics 19 that are arranged external to the wheel bearing unit 1 and together form a measurement device 20.

LIST OF REFERENCE NUMBERS

1 Wheel bearing unit
2 Wheel hub
3 Wheel bearing
4 Ring flange
5a Bearing ring
5b Bearing ring
6 Rolling bearing
7 Bearing ring
8 Drive joint
9 Spur gearing
10 Shoulder
11 Hollow space
12 Threaded connection
13 Threaded connection head
14 Threaded shaft
15 Threaded hole
17 Inner wall
18 Sensor
19 Evaluation electronics
20 Measurement device
21 Hub flange

The invention claimed is:

1. A wheel bearing unit for supporting a drivable vehicle wheel, comprising a wheel hub that forms a hollow space and is supported for rotation by a wheel bearing formed as a rolling bearing and supported in a wheel carrier, the wheel hub is connected to the vehicle wheel by a hub flange and on the opposite side of the wheel hub relative to the hub flange, the wheel hub meshes with a positive fit connection with a drive element by spur gearing and is secured with a non-positive-fit connection by a threaded connection, and for measuring a torque, a sensor module including at least one sensor that determines torque by measuring an inverse magnetostrictive effect on an inner wall which is integral with the wheel hub and which defines the hollow space of the wheel hub.

2. The wheel bearing unit according to claim 1, wherein for determining the inverse magnetostrictive effect, the at least one sensor includes a coil or semiconductor sensor that detects changed magnetic properties caused by a torque applied to the inner wall and is provided within the hollow space of the wheel hub.

3. The wheel bearing unit according to claim 2, wherein the at least one sensor used for detecting the changed magnetic properties is connected to evaluation electronics that together form a measurement device.

4. The wheel bearing unit according to claim 3, wherein a wireless signal and energy transmission is provided between the at least one sensor and the evaluation electronics.

5. The wheel bearing unit according to claim 3, wherein the measurement device also includes at least one of a temperature sensor or a rotational speed sensor.

6. The wheel bearing unit according to claim 1, wherein the inner wall is coated with a magnetic pre-conditioning coating which enhances the inverse magnetostrictive effect.

7. A wheel bearing unit for detecting and controlling drive torques on drivable vehicle wheels, comprising:
- a sensor for measuring a drive torque on each drivable vehicle wheel by an inverse magnetostrictive effect on an inner wall forming a central cavity within a wheel hub,
- evaluation electronics that detect all measurement values of the inverse magnetostrictive effect from the sensor, and
- a torque control system including a drive element connected to the wheel hub of each drivable vehicle and a controller that is configured to control the drive torque applied by each drive element based on the measurement values.

\* \* \* \* \*